US007003584B1

(12) United States Patent
Floyd et al.

(10) Patent No.: US 7,003,584 B1
(45) Date of Patent: Feb. 21, 2006

(54) APPARATUS AND METHOD FOR ACCESSING REQUEST HEADER INFORMATION USING A TRANSCODING FILTER SERVLET

(75) Inventors: Richard A. Floyd, Chapel Hill, NC (US); John R. Hind, Raleigh, NC (US); Marcia L. Peters, Raleigh, NC (US); Brad B. Topol, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 961 days.

(21) Appl. No.: 09/611,158

(22) Filed: Jul. 6, 2000

(51) Int. Cl.
*G06F 15/16* (2006.01)
(52) U.S. Cl. .................................... 709/246; 709/217
(58) Field of Classification Search ............... 707/104, 707/3, 10; 709/217, 224, 229, 246; 455/422.1; 715/513
See application file for complete search history.

(56) References Cited

U.S. PATENT DOCUMENTS

| 6,023,714 | A | * | 2/2000 | Hill et al. ..................... 715/513 |
| 6,345,279 | B1 | * | 2/2002 | Li et al. ....................... 707/104 |
| 6,374,300 | B1 | * | 4/2002 | Masters ........................ 709/229 |
| 6,678,518 | B1 | * | 1/2004 | Eerola ....................... 455/422.1 |
| 6,715,129 | B1 | * | 3/2004 | Hind et al. .................. 715/513 |

OTHER PUBLICATIONS

Mohan et al, "Multimedia content customization for universal access", Nov. 1998, SPIE Photonics East, p. 1-9.*
Sung-Ik Son, "WebSphere Solutions for XML, XSL Stylesheet, and Transcoding for Web Application Data Accessible by Variou Devices", IBM, Nov. 2001.*
IBM WebSphere Transcoding Publisher for Multiplatforms, Version 4.0, IBM Corporation, 2001.*
Smith et al, "Transcoding Internet Content for Heterogeneous Client Devices", IEEE Int. Conf. On Circuits and System, May 1998.*
Mohan et al, "Adapting Multimedia Internet Content for Universal Access", IEEE Trans. Multimedia, vol. 1, Jan. 1999.*
Smith et al, "Content-based Transcoding of Images in the Internet", Proc. IEEE Inter. Conf. Image Processing, Oct. '98.*
IEEE Personal Communications, Aug. 1998, Adapting to Network and Client Variation Using Infrastructural Proxies: Lessons and Perspectives by A. Fox, et al, Univ. of California, Berkeley, pp 10-19.

* cited by examiner

*Primary Examiner*—Jungwon Chang
(74) *Attorney, Agent, or Firm*—Duke W. Yee; Jerry W. Herndon; Stephen R. Tkacs (57) ABSTRACT

The present invention provides an apparatus and method for accessing request header information used to transcode servlet output. The apparatus and method of the present invention includes a preamble that stores request header information from a request sent by a client device. The request header information is then provided to the transcoder along with the generated content data. The transcoder then performs appropriate transcoding on the generated content data based on the request header information supplied by the preamble. The transcoded content data is then sent to the client device. In this way, the client device is able to obtain content from a much larger set of content sources than with conventional systems.

18 Claims, 8 Drawing Sheets

APPARATUS AND METHOD FOR ACCESSING REQUEST HEADER INFORMATION USING A TRANSCODING FILTER SERVLET

BACKGROUND OF THE INVENTION

1. Technical Field

The present invention is directed to an apparatus and method for accessing request header information to use in transcoding response data.

2. Description of Related Art

Transcoding is the process of customizing data content without requiring a change to the original generating application. Transcoding is performed for a variety of reasons including meeting the unique presentation requirements of a particular type of client device, a particular user, or a particular kind of connection, implementing security policies, selectively hiding portions of the data that are not destined for a particular user, selectively encrypting the data, and the like. Transcoding is usually performed on a web server by a mechanism, e.g., a transcoding servlet or other transcoding plugin, that acts as an intermediary between the client device and the content generator.

When a client device sends a content request to a server, the request message includes a request header. The request header typically includes information identifying the device type, user identification, passwords, uniform resource locator (URL) requested, HyperText Transfer Protocol (HTTP) method used (e.g., GET or POST), and the like. This header data is passed by the web server to the content generator process but is not passed on to subsequent steps in the remaining output path on the way to the requesting device, such as to the transcoding mechanism.

This means that in the prior art, without changing the content generator, that transcoding is limited to a fixed manipulation which can not react to the client device characteristics. The client is hence limited to requesting content data from content sources that are formatted for the particular type of client device. This severely limits the content sources that some client devices are able to have access to and the value that transcoding can provide to the web server.

Figure 5:
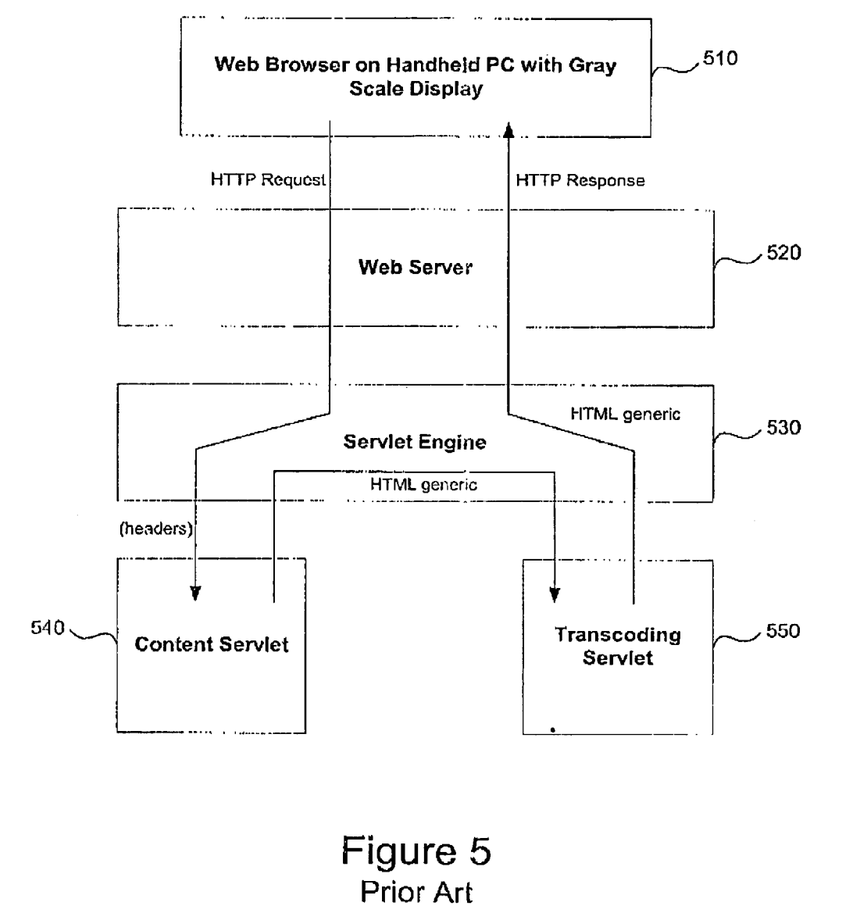
FIG. 5 is a block diagram illustrating a prior art mechanism for processing a content request from a client device.

FIG. 5 illustrates the prior art problem when a browser on a small handheld personal computer (PC), with a screen only capable of showing gray scale, makes a request to a Java Servlet based web server. As shown in FIG. 5, the handheld PC sends an HTTP request message from a Web browser 510 running on the handheld PC to a Web server 520. The HTTP request is passed to a servlet engine 530 which invokes a content generator servlet 540, passing the request information. The retrieved content is passed to a transcoding servlet 550 as generic HTML. The transcoding servlet 550 transcodes the generic HTML and forwards it to the handheld PC via the servlet engine 530 and Web server 520, as a HTTP response message.

Thus, when the handheld PC targets a generic content generator, for example a Java Server Page (JSP) authored for ideal presentation on a large desktop PC with a color display, the resulting web page presentation will be returned in a format not conducive for display on the device. This is because the transcoder has no way of knowing the device characteristics which were in the original request header.

Thus, it would be advantageous to have an apparatus and method for providing client device characteristic information to a transcoding servlet in order to customize data content for presentation on the client device.

SUMMARY OF THE INVENTION

The present invention provides an apparatus and method for accessing request header information used to transcode servlet output. The apparatus and method of the present invention includes a preamble that stores request header information from a request sent by a client device. The request header information is then provided to the transcoder along with the generated content data. The transcoder then performs appropriate transcoding on the generated content data based on the request header information supplied by the preamble. The transcoded content data is then sent to the client device. In this way, the client device is able to obtain content from a much larger set of content sources than with conventional systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
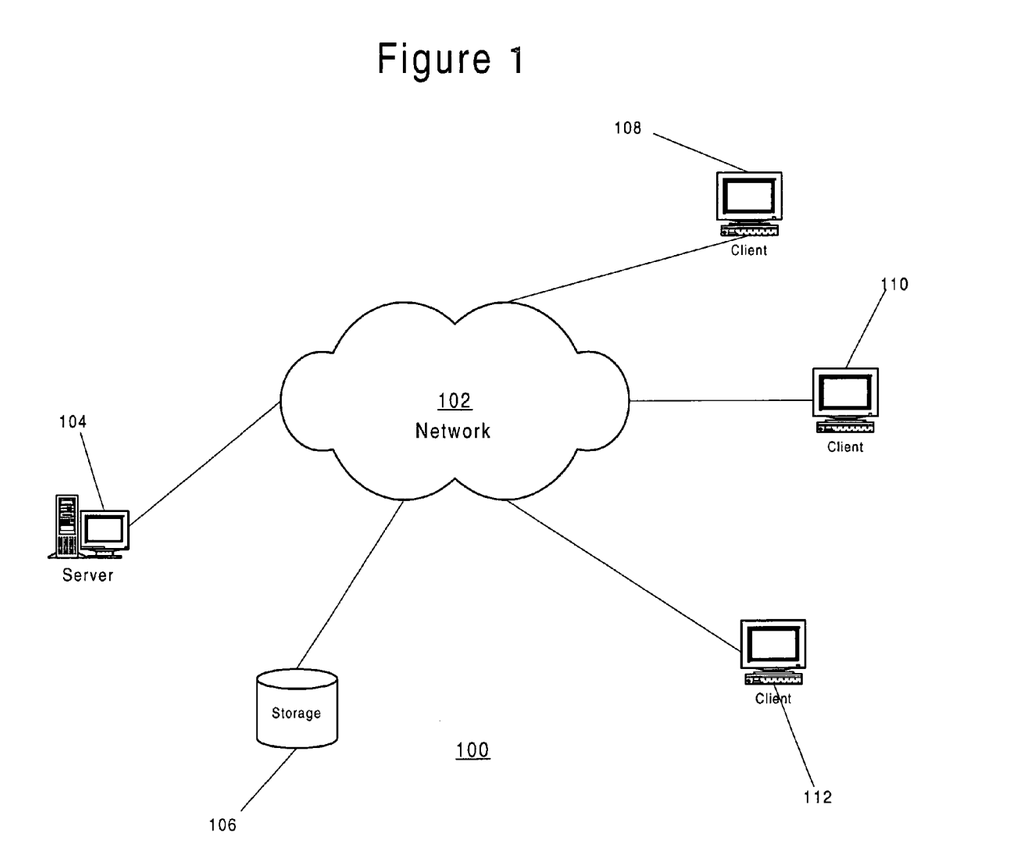
FIG. 1 is an exemplary diagram of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
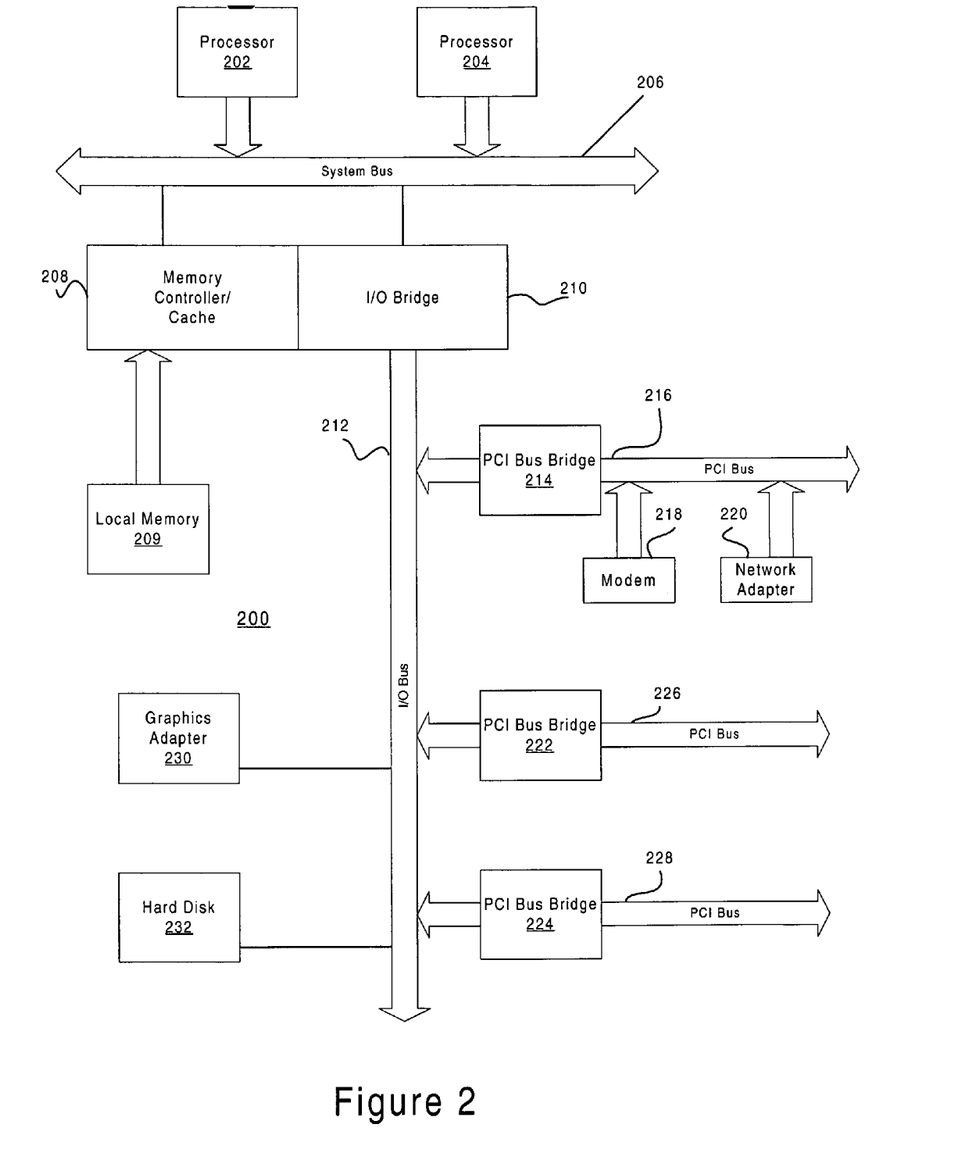
FIG. 2 is an exemplary diagram of a data processing system in which the present invention may be =implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

When a client device sends a content request to a server, the content request includes a request header that includes identification information. This identification information identifies, for example, the type of client device, the capabilities of the client device, the URL of the requested web server resource, the HTTP method being used, and additional HTTP headers. This information is stored by the preamble in accordance with the present invention, in a manner to be described in more detail hereafter, for use during transcoding of generated content data so that the content data is properly formatted for the client device. Once the content data is generated by the server, the content data and the request header information are used for transcoding and the transcoded data is sent to the client device. In this way, general content data may be customized for the particular client device requesting the content data.

The server 200 executes one or more servlets for performing various types of processing of client requests. A servlet is an application that runs in a web server or application server and provides server-side processing, typically to access a database or perform e-commerce processing.

One such servlet that is executed by the server 200 is a transcoding filter servlet. The transcoding filter servlet performs transcoding of content data from one format to another such that the content data is in a form that is customized for the particular client device from which the content request was received. The transcoding filter servlet may be, for example, a Multipurpose Internet Mail Extensions (MIME) filter servlet. MIME encodes the files using one of a number of encoding methods and decodes it back to its original format at the receiving end. A MIME header is added to the file which includes the type of data contained and the encoding method used. S/MIME (Secure MIME) is a version of MIME that adds RSA encryption for secure transmission and may also be used without departing from the spirit and scope of the present invention.

In addition to the transcoding filter servlet, the server 200 of the present invention also executes a preamble servlet. The preamble servlet performs the function of receiving a content request message from a client device, storing the request header information included in the content request message, and providing the request header information to the transcoding filter servlet when the content data is sent to the transcoding filter servlet. The transcoding filter servlet may then make use of the request header information to determine how to transcode the content data for use by the client device.

Those of ordinary skill in the art will recognize that there may be several methods for storing and retrieving header information in accordance with the present invention. For example, one possible embodiment, which may be executed on IBM WebSphere 2.0.3 may store and retrieve header information in the following manner.

In the following embodiment, header values are aggregated and concatenated into a Java String object. A reference to the String object may be stored as an attribute of the Servlet engine's session object using, for example, the following Java code section:

com.sun.server.http.HttpServiceRequest bradReq=(com.sun.server.http.HttpServiceRequest) req;
   bradReq.setAttribute("brad", headervalues);
   This stored header information can then be retrieved by a MIME filter transcoding servlet using the following code section:
   com.sun.server.http.HttpServiceRequest bradReq=(com.sun.server.http.HttpServiceRequest) req;

String headervalues=(String) bradReq.getAttribute ("brad");

The transcoding filter servlet and the preamble servlet may be organized in a chain with regard to one another. Servlet chaining is generally known in the art and thus, the details of implementing the chaining are not set forth here. See, for example, Hunter, J, Crawford, W., *Java Servlet Programming*, O'Reilly and Associates, 1998.

Figure 3A:
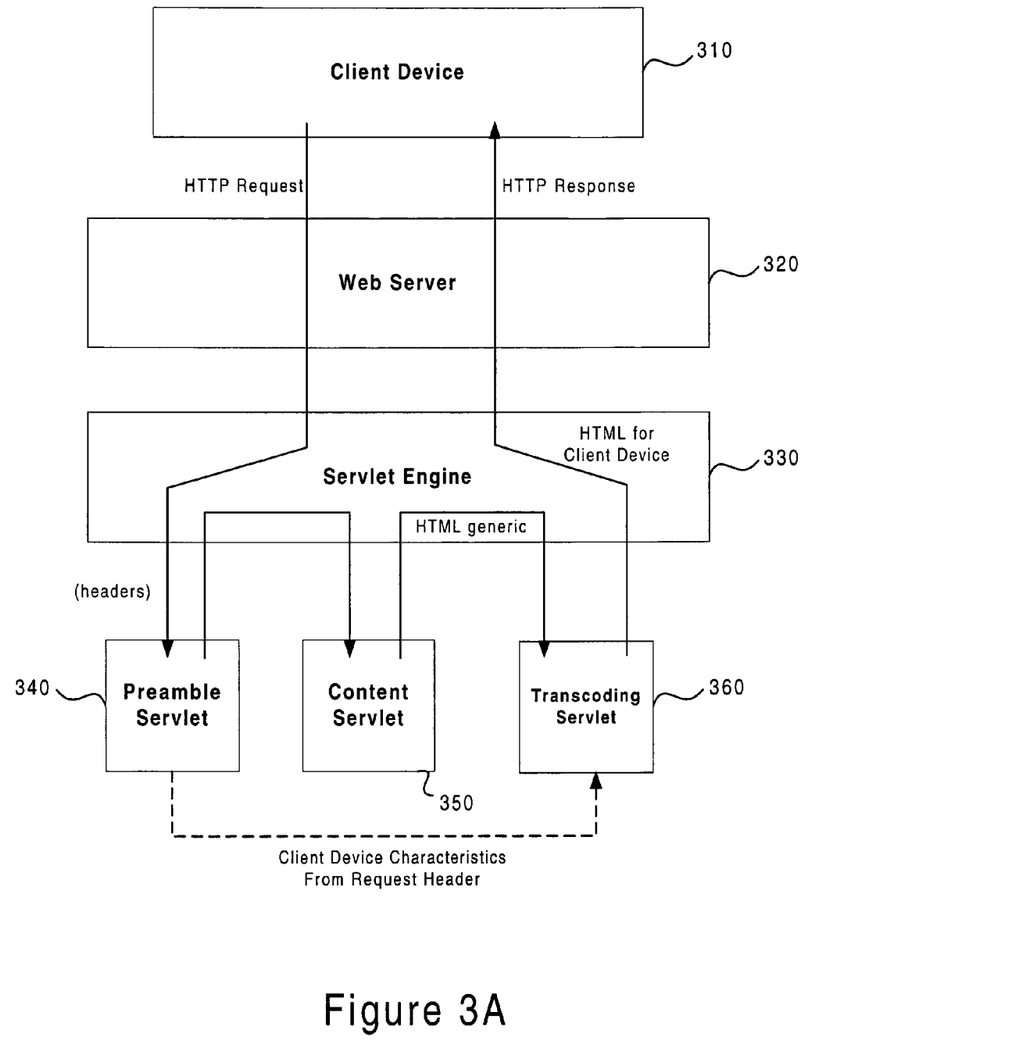
FIGS. 3A and 3B are exemplary block diagrams illustrating exemplary embodiments of the present invention using servlet chain organizations.
Figure 3B:
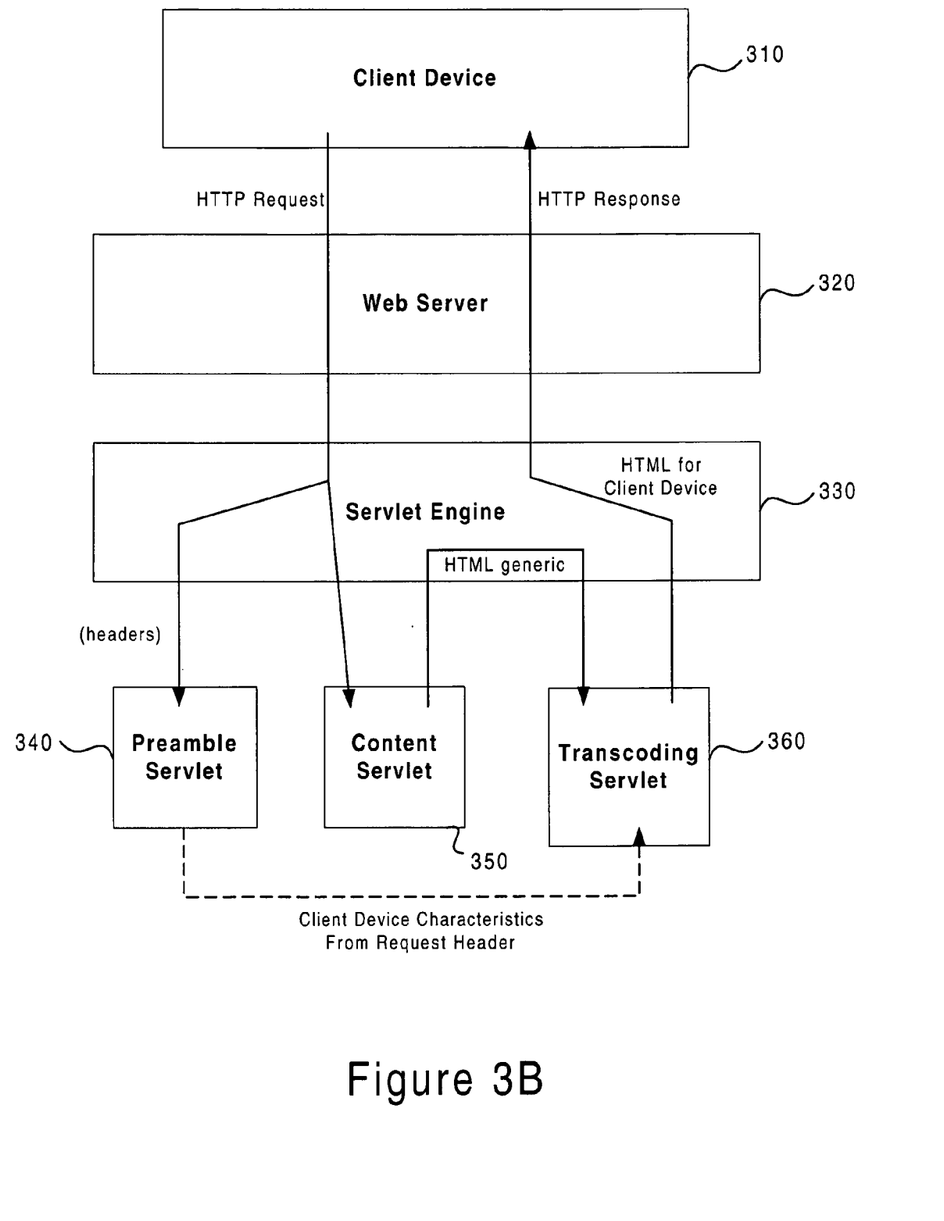

FIGS. 3A and 3B provide exemplary block diagrams illustrating exemplary embodiments of the present invention in which servlet chaining is utilized. FIGS. 3A and 3B are directed to the execution order for sending the requested content data back to a client device, however, similar chaining is applicable to the receipt of the content request from the client device.

As shown in FIG. 3A, a first embodiment of the present invention includes a preamble servlet 340, a content generator 350 and a transcoding servlet 360. The preamble servlet 320 stores request header information obtained from the request message sent by the client device 310. This request header information is stored in a data structure identified with a particular request. In this way, when a response message is generated with the requested content data, the response message may be matched to the request message and thus, the request header information may be retrieved from the data structure in the preamble servlet 340.

The preamble servlet 340 passes the request header information to the transcoding servlet 360. In addition, the preamble servlet 340 echoes the request message to the content generator 350 so that the requested content data can be generated and forwarded to the transcoding servlet 360.

The transcoding servlet 360 performs appropriate transcoding of the content data based on the client device information, e.g., client device characteristics, obtained from the request header information. Such transcoding is generally known in the art and thus, the details of the transcoding operation will not be described here. See, for example, A. Fox, S. Gribble, Y. Chawathe, E. Brewer, "Adapting to Network and Client Variation Using Infrastructural Proxies: Lessons and Perspectives", *IEEE Personal Communications*, vol. 5, no. 4, Aug. 1998, pp. 10–19. The transcoded content data is then sent to the client device 310 in the appropriate format for presentation by the client device 310.

FIG. 3B provides an alternative servlet chain that may be utilized with the present invention. The embodiment depicted in FIG. 3B differs from that of FIG. 3A in that the request message from the client device 310 is passed to both the preamble servlet 340 and the content generator 350 directly from the servlet engine 330. In this way, the preamble servlet may extract the header information from the request message and store it while the content generator 350 is generating the requested content. Throughput may thereby be increased.

Figure 3C:
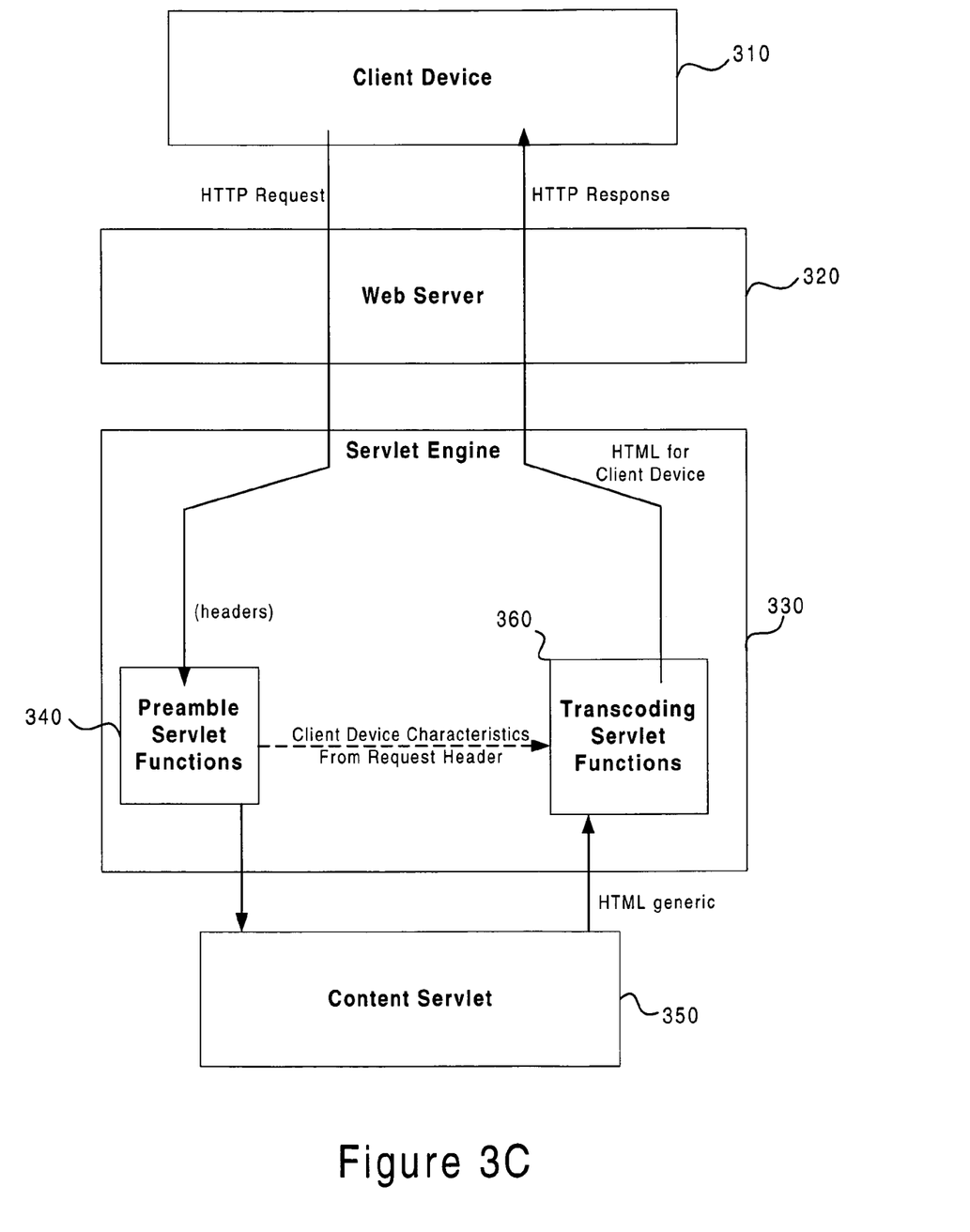
FIG. 3C is an exemplary block diagram illustrating an exemplary embodiment of the present invention wherein the preamble servlet and the transcoding servlet are embedded as extensions of the servlet engine.

FIG. 3C is an exemplary block diagram that illustrates an additional alternative embodiment of the present invention. The embodiment shown in FIG. 3C operates in a similar manner as the embodiment shown in FIG. 3A, and optionally as the embodiment shown in FIG. 3B (indicated by the dashed line extending to the content generator). The difference between the embodiments shown in FIGS. 3A–3B and the embodiment in FIG. 3C is that the preamble servlet 340 and the transcoding servlet 360 are extensions of the servlet engine 330 rather than separate servlets.

Figure 3D:
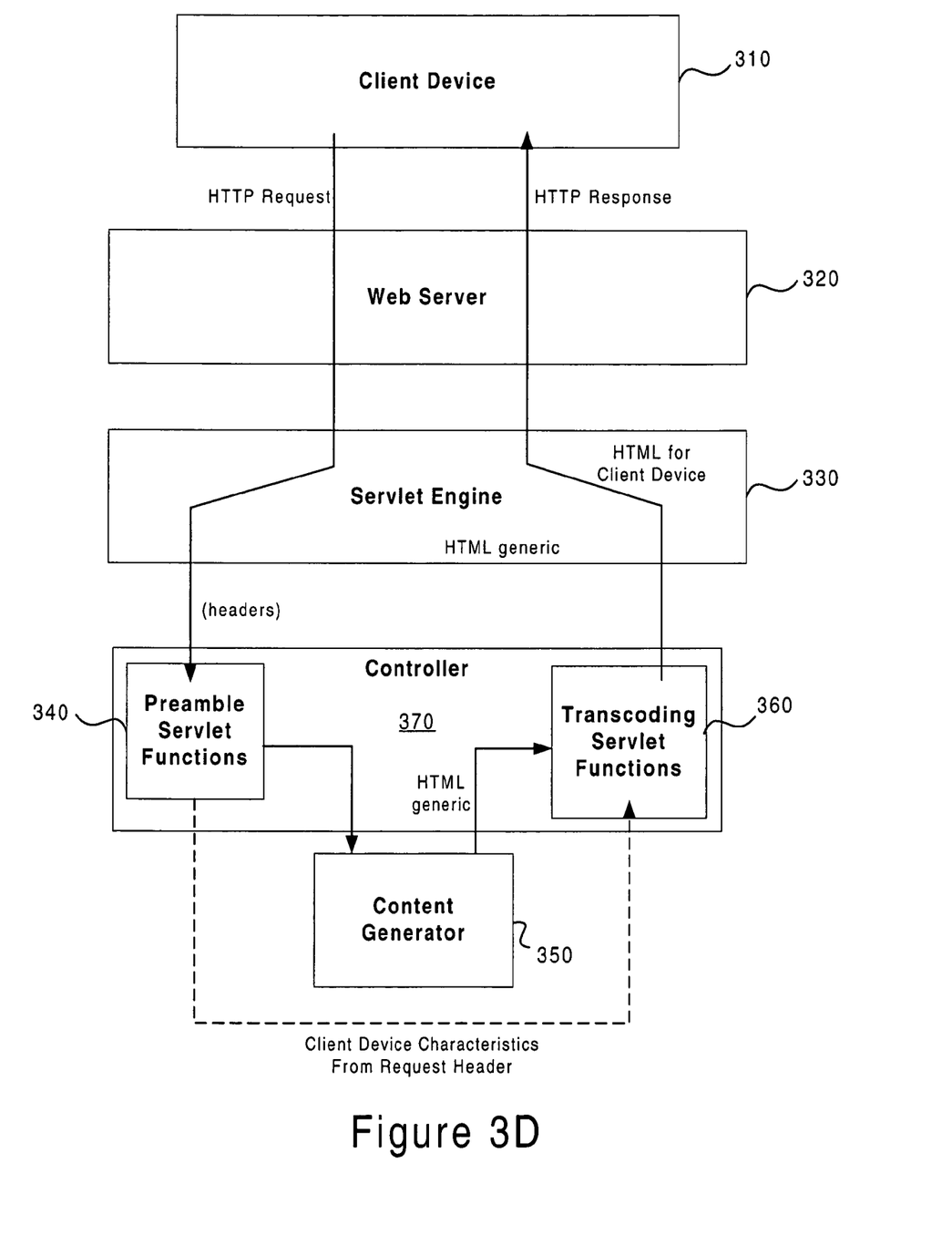
FIG. 3D is an exemplary block diagram illustrating an exemplary embodiment of the present invention in which a servlet chaining is not utilized and a controller is used in place of a targeted servlet.

FIG. 3D illustrates still another embodiment of the present invention in which servlet chaining is not utilized.

As shown in FIG. 3C, a controller 370 is utilized in place of a targeted servlet. The controller 370 invokes the preamble servlet 340 functions and transcoding servlet 360 functions and makes calls to the content generator 350 for the requested content. The preamble servlet 340 functions and the transcoding servlet 360 functions may be implemented using, for example, corresponding Java methods, subroutines, and other types of computer implemented code.

As mentioned above, in conventional systems, the request header information is not available to the transcoding process. Thus, the client device is limited to only a particular subset of content sources from which the client can obtain content data. With the present invention, however, the client device is able to obtain content data from any content source that is capable of transcoding the content data to a format useable by the client device. This is made possible because the transcoding process, e.g., the transcoding filter servlet, is allowed access to the request header information to ascertain the proper transcoding for the client device.

Figures 4A, 4B:
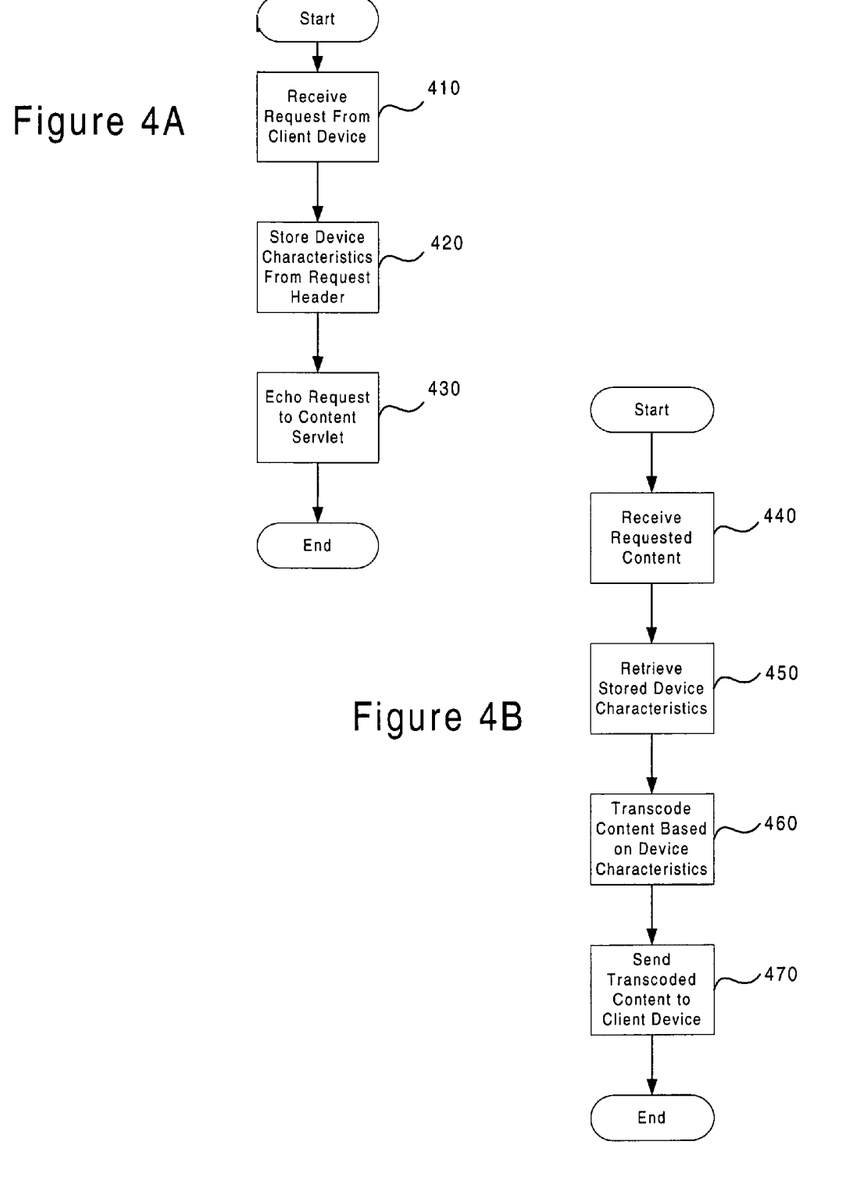
FIG. 4A is a flowchart outlining an exemplary operation of the preamble servlet of the present invention when processing a request for content from a client device.
FIG. 4B is a flowchart outlining an exemplary operation of the transcoder of the present invention when processing a request for content from a client device.

FIG. 4A is a flowchart outlining an exemplary operation of the preamble servlet of the present invention when processing a content request from a client device. As shown in FIG. 4A, the operation starts with the receipt of a request from the client device (step 410). This request includes a request header as described above. The client device characteristic information from the request header is stored in a data structure (step 420) and the request message is echoed to the content generator (step 430). As described above, the storage of the client device characteristic information may be done using a data structure indexed in such a manner that the client device characteristic information may be retrieved when generating a response message.

FIG. 4B is a flowchart outlining an exemplary operation of the transcoding servlet of the present invention when processing a content request from a client device. As shown in FIG. 4B, the operation starts with the requested content data being received by the transcoding servlet (step 440). The client device characteristic information is retrieved from the preamble servlet (step 450) and used to transcode the requested content data (step 460). The transcoded content data is then sent to the client device in a format suited for presentation by the client device (step 470).

Thus, the present invention provides a mechanism by which the characteristic information of a client device may be known to a transcoding servlet so that proper formatting of requested content data may be performed. With the present invention, network servers may store generic content data for a plurality of different client devices, which can be customized by a transcoding process so that the content data is properly presented on the particular client device that requested the content data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of formatting content data for presentation on a client device, comprising:
   receiving a request for content data, the request having client device characteristic information and identifying requested content data;
   storing, by a preamble servlet, the client device characteristic information in a data structure associated with the request;
   passing, by the preamble servlet, the client device characteristic information to a transcoding servlet;
   generating the requested content data to form generic content data;
   matching the generic content data to the request; and
   transcoding, by the transcoding servlet, said generic content data using said client device characteristic information in the data structure associated with the request to produce transcoded content data.

2. The method of claim 1, further comprising:
   generating a response message including the transcoded content data; and
   transmitting the response message to the client device.

3. The method of claim 1, wherein the request is an hypertext transport protocol request message, and wherein the client device characteristic information is obtained from a header of the hypertext transport protocol request message.

4. The method of claim 3, wherein the header includes at least the client device type and one or more of user identification, passwords, uniform resource locator (URL) requested and Hyper Text Transfer Protocol (HTTP) method used.

5. The method of claim 1, wherein the step of storing, by the preamble servlet, the client device characteristic information in a data structure associated with the request and the step of generating the requested content data to form generic content data are performed concurrently.

6. The method of claim 1, wherein the method is implemented in a network server.

7. An apparatus for formatting content data for presentation on a client device, comprising:
   a preamble servlet;
   a content generator coupled to the preamble servlet; and
   a transcoding servlet coupled to the content generator, wherein when a request for the content data is received by the apparatus, the request having client device characteristic information and identifying requested content data, the preamble servlet stores the client device characteristic information in a data structure associated with the request, the preamble servlet passes the client device characteristic information to the transcoding servlet, and the content generator generates the requested content data to form generic content data, the transcoding servlet matches the generic content data to the request, and wherein the transcoding servlet transcodes the generic content data using the client device characteristic information is the data structure associated with the request to produce transcoded content data.

8. The apparatus of claim 7, further comprising a servlet engine that generates a response message including the transcoded content data and transmits the response message to the client device.

9. The apparatus of claim 7, wherein the request is a hypertext transport protocol request message, and wherein the client device characteristic information is obtained from a header of the hypertext transport protocol request message.

10. The apparatus of claim 9, wherein the header includes at least the client device type and one or more of user identification, passwords, uniform resource locator (URL) requested and Hyper Text Transfer Protocol (HTTP) method used.

11. The apparatus of claim 7, wherein the preamble servlet stores the client device characteristic information in a data structure associated with the request and the content generator generates the requested content data to form generic content data concurrently.

12. The apparatus of claim 7, wherein the preamble servlet echoes the request to the content generator.

13. The apparatus of claim 7, wherein the preamble servlet, content generator and transcoding servlet are implemented in a network server.

14. A computer program product in a computer readable medium for formatting content data for presentation on a client device, comprising:
   first instructions for receiving a request for the content data, the request having client device characteristic information and identifying requested content data;
   second instructions for storing, by a preamble servlet, the client device characteristic information in a data structure associated with the request;
   third instructions for passing, by the preamble servlet, the client device characteristic information to a transcoding servlet;
   fourth instructions for generating the requested content data to form generic content data;
   fifth instructions for matching the generic content data to the request; and
   sixth instructions for transcoding, by the transcoding servlet, said generic content data using the client device characteristic information in the data structure associated with the request to produce transcoded content data for display on said client device.

15. The computer program product of claim 14, further comprising:
   seventh instructions for generating a response message including the transcoded content data; and
   eighth instructions for transmitting the response message to the client device.

16. The computer program product of claim 14, wherein the request is a hypertext transport protocol request message, and wherein the client device characteristic information is obtained from a header of the hypertext transport protocol request message.

17. The computer program product of claim 14, wherein the first instruction and fourth instructions are performed concurrently.

18. The computer program product of claim 14, further comprising seventh instructions for echoing the request from the preamble servlet to a content generator.

* * * * *